Patented Dec. 21, 1937

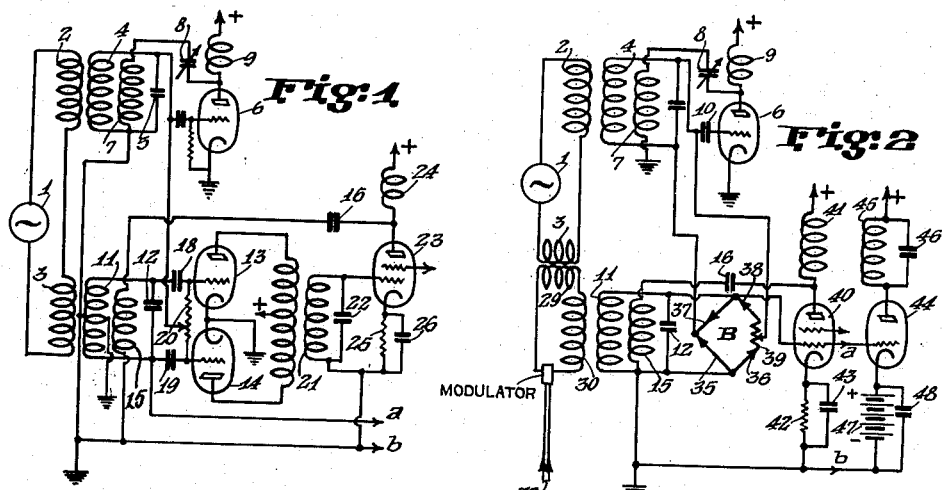

2,103,090

UNITED STATES PATENT OFFICE 2,103,090

MEANS FOR AND METHOD OF GENERATING ELECTRICAL CURRENTS

Jozef Plebanski, Warsaw, Poland, assignor to Radio Patents Corporation, New York, N. Y., a corporation of New York Application November 27, 1935, Serial No. 51,821
In Poland December 5, 1934

12 Claims. (Cl. 250—36)

My invention relates to a system for and a method of producing distorted wave forms from a substantially sinusoidal input wave and more particularly has for its object to provide an impulse or peak voltage generator for producing short peak voltages at regular intervals from a substantially sinusoidal input or exciting voltage.

Peaked voltage or current impulses have many uses in both the electrical and radio arts. According to one application, an impulse exciting voltage is used to impinge upon an oscillatory circuit to produce self-excited oscillations therein following each other at regular intervals in such a manner that the resultant oscillation obtained constitutes a substantially undamped wave. This type of shock or impulse excitation has the advantage of high efficiency as compared to the orthodox type of regenerative oscillator and presents special advantages for producing high power ultra-short wave oscillations.

There are many other uses for peaked voltage or current impulses, such as for timing the ignition of gaseous discharge valves, to serve as controlling or synchronizing potentials for signalling apparatus operating in synchronism, such as in television and picture telegraphy, and many other uses.

According to a further object of the invention, an ordinary sine-shaped wave which may be either modulated or unmodulated is transformed into uni-directional impulses of short duration corresponding to every second half cycle of the exciting current which may have any desired low or high frequency, dependent on the desired frequency of the peak voltage impulses to be obtained.

As pointed out, the use of highly peaked short impulses in place of sinusoidal shaped wave forms presents great advantages in connection with the generation, amplification and modulation of alternating currents consisting primarily in a substantial increase of the conversion efficiency which, under circumstances, may reach values as high as 95% as compared to a maximum of about 78% obtained with the orthodox methods of generation or amplification at present used in the art.

A further advantage of the invention resides in the possibility of generating ultra-short waves of high power by means of a simple circuit arrangement utilizing a shock excitation method in combination with an impulse driving system according to the present invention.

The above and further objects and aspects of the invention will become more apparent from the following detailed description taken with reference to the accompanying drawing wherein I have illustrated several circuit arrangements embodying the invention.

In the drawing, wherein similar reference characters identify similar parts throughout;

Fig. 1 illustrates a basic circuit arrangement for producing periodic current or voltage impulses from a sinusoidal input or supply voltage according to the invention.

Fig. 2 is a modification of a circuit according to Fig. 1.

Fig. 3 represents theoretical curves illustrating the function and operation of a system according to Figs. 1 and 2.

Fig. 4 represents a theoretical curve illustrating the production of shock excited oscillations by means of an arrangement according to the invention.

Figs. 5, 6, and 7 illustrate several modifications for shock excited systems utilizing an impulse driving system according to the invention.

Figs. 8 and 9 show, respectively, a receiving circuit and an explanatory diagram of a super-regenerative radio receiver embodying an arrangement according to the invention.

Fig. 10 represents a further diagrammatic curve explanatory of the method of modulation of an impulse or peak voltage wave in an arrangement as shown by Fig. 2.

With the principal object of the invention in view, the system and method underlying the same utilizes what I have termed as "self-modulation"; that is, the combination of alternating currents of the same frequency in a device exhibiting a non-linear current-voltage characteristic or any other type of modulator known in the art. The term "modulation" as known and used in the art, basically involves the combination of two currents of different frequencies in such a manner that a product function of the two currents is obtained in the output circuit, resulting in currents of the sum and difference frequencies known as modulation side frequencies or side bands. In the case of "self-modulation" according to the present invention, two components; that is, the modulating current and the current to be modulated, are of substantially the same frequency whereby the result obtained will be a substantial distortion of the original current wave. According to the invention, the thus obtained resultant or distorted current wave is used for regeneration of the original nonmodulated current by means of a suitable stabilized and preferably adjustable feedback arrangement in such a manner that with the proper design of the separate circuit constants, sharply peaked periodic output currents or voltages of short duration are obtained.

Referring more particularly to Fig. 1 of the drawing, I have shown therein a basic circuit arrangement for practicing the invention. Numeral 1 represents an input current source adapted to supply an alternating current of a desired frequency which may be a dynamo generator, an electron valve oscillator, or any other suitable generating device. The generator 1 serves to energize simultaneously two oscillatory circuits each comprised of an induction coil 4 and 11 shunted by a capacity 5 and 12 and excited from the generator 1 through coupling coils 2 and 3, respectively. The circuit 11, 12 simultaneously serves as output circuit and for this purpose is connected with the output terminals shown at $a$ and $b$, the former being connected to the lower electrode of the condenser 12 and the latter being connected through ground to the center of the coil 11. The circuit 11, 12 also acts as the input circuit of a pair of electron valves 13 and 14 connected in push-pull. For this purpose the opposite terminals of the circuit are connected to the grids of the valves through grid coupling condensers 18 and 19 in a manner well known in the art. The anodes of the valves 13 and 14 are connected through the primary 17 of a push-pull transformer having a center tap connected to the positive pole of a high potential source indicated by a plus sign. The cathodes of the two valves are connected together and grounded in a manner well known in push-pull circuits. The output current supplied by the push-pull system serves to energize a tuned circuit comprising an induction coil 21 forming the secondary of the push-pull transformer and shunted by a condenser 22. The circuit 21, 22 serves to control a further electron valve 23 and for this purpose interconnects the grid and the cathode of the valve in a known manner as shown in the drawing. The cathode is shown to be grounded through a cathode biasing resistance 25 shunted by a decoupling condenser 26. The anode of the valve 23 is connected to a high potential source in a known manner through a high frequency choke coil 24.

I have furthermore shown a regenerative or feedback circuit interconnecting the anode of the valve 23 with the cathode or ground and comprising a feedback condenser 16 and a reaction or tickler coil 15 in inductive relationship with the induction coil 11 of the input circuit.

In this manner the two grids of the push-pull valves 13 and 14 are excited by the currents in the first input circuit 11, 12 at opposite phase in a manner well known in push-pull systems. I have furthermore shown the grids of the valves 13 and 14 to be excited by the second input circuit 4, 5 at equal phase through a resistance 20 connecting the grids of the valves and having a suitable tap point, preferably its center point connected to the upper electrode of condenser 5, the lower electrode of which is connected to ground. The circuit 4, 5 has furthermore been shown to be regenerated in the usual manner by means of an electron valve 6 controlled by the circuit 4, 5 through a grid coupling condenser 10 and grid leak 11' in a known manner and having its cathode-anode path shunted by a regenerative feedback circuit comprising a variable reaction condenser 8 and feedback or tickler coil 7 in inductive relation with the induction coil 4. The anode of the valve 6 is shown connected to a high potential source in series with a high frequency choke coil 9 in a manner well known. The regeneration from the valve 23 to the input circuit 11, 12 is preferably adjusted in such a manner as to oppose the current in the latter circuit; that is, the effect obtained is degenerative in increasing the damping of the circuit.

The operation of a circuit as described is as follows: If the circuits 4, 5, and 11, 12 are exactly tuned to resonance with the frequency of the source 1, the currents in the two circuits are combined through the action of the push-pull valves 13 and 14 in such a manner that a distorted resultant output current is obtained forming a product function of both input currents. This distorted current is then utilized to react upon the input circuit 11, 12 in such a manner that by the proper design of the separate circuit constants of the system, highly peaked current impulses are obtained in the circuit 11, 12 which may serve to energize any desired utilization circuit or apparatus connected to the output terminals $a$ and $b$.

The function and operation of the system described may be further explained by theoretical analysis as follows:

If both circuit 4, 5, and 11, 12 are exactly tuned to resonance with the impressed frequency supplied by generator 1, the following equations for the voltages induced in both circuits may be written:

(a) For the circuit $L_1 C_1$ (4, 5)

$$i_1 R_1 = E_1 \sin \omega t; \; i_1 = \frac{E_1}{R_1} \sin \omega t$$

(b) For the circuit $L_2 C_2$ (11, 12)

$$i_2 R_2 + N_1 i_2 + N_2 i_1 \cdot i_2 = E_2 \sin \omega t$$

From the above, it follows that:

(c) $$i_2 = \frac{E_2 \sin \omega t}{R_2 + N_1 + N_2 \frac{E_1 \sin \omega t}{R_1}} = \frac{E_2 \sin \omega t}{\Sigma R}$$

wherein $L_1$ represents the inductance of the induction coil 4, $C_1$ the capacity of the condenser 5 and $R_1$ the ohmic or total loss resistance of the circuit 4, 5. $L_2$ represents the inductance of the induction coil 11, $C_2$ the capacity of the condenser 12, and $R_2$ the ohmic or total loss resistance of the circuit 11, 12 and $N_1$, $N_2$ are coefficients dependent on the valve characteristics, the mutual inductance between the coils 11 and 15, the value of the condenser 16, and other circuit constants.

The above result (Equation $c$) is obtained if the combination of the two current components through the valves 13 and 14 takes place according to a non-linear law; that is, if the anode current $i_a = k_1 e_g + k_2 e_g^2$ wherein $e_g$ is the impressed grid voltage and $k_1$, $k_2$ coefficients depending on the valve characteristics. In other words, the combination must be such that a resultant member is obtained containing the product of the currents $i_1$ and $i_2$. The latter is the case for a non-linear valve characteristic as pointed out, and it is understood that any other known arrangement may be provided for securing a product function of the current components $i_1$ and $i_2$ such as an electronic modulator or mixer wherein the components are applied to separate electrostatically isolated grids placed in the same discharge stream of an electron valve in such a manner that a product function of the two currents is obtained in the common output circuit by the direct combining function of the electron stream.

From the Equation c it follows that the total resultant resistance $$\Sigma R = R_2 + N_1 + N_2 \frac{E_1 \sin \omega t}{R_1}$$

is not a constant value as usually but is composed of the constant terms $R_1$ and $N_1$ and of a further term varying from a plus to a minus value according to a sinusoidal law. In this manner the total acting resistance $\Sigma R$ in the circuit 11, 12 varies between a maximum and a minimum as shown by the dotted curve in the diagram of Fig. 3 of the drawing.

If the term $$N_2 \frac{E_1 \sin \omega t}{R_1}$$

is so chosen that for $\sin \omega t = -1$, it is nearly equal to $R_2 + N_1$ then it is seen that the total resistance $\Sigma R$ for this instant is nearly or equal to zero and that the current $i_2$ for this instant will reach an extremely high value or peak as shown in Fig. 3. It is also possible to design the circuit constants in such a manner that for $\sin \omega t = \omega - 1$ the total resistance $\Sigma R$ assumes a negative value resulting in still sharper current peaks $i_2$ in the circuit 11, 12 as is understood.

For other instantaneous values, the resistance $\Sigma R$ is so great that $i_2$ is nearly zero or of practically very low value. As a result, the form of the current $i_2$ and accordingly of the corresponding voltage at the terminals of the induction coil 11 or condenser 12, respectively, $(i_2/\omega C_2)$ and the output terminals $a-b$ assumes the shape of sharp peaks or impulses as indicated in the drawing. The sharpness of these peaks can be controlled within wide limits by the proper design of the circuit constants as will be obvious.

In practice, it has been found that the constants $N_1$ and $N_2$ are dependent on each other and that they both increase or decrease in some definite proportion. In order to make $$R_2 + N_1 - N_2 \frac{E_1}{R_1} = 0$$

it is advisable to decrease either $R_2$ or $R_1$ or to increase $E_1$. The latter can be easily accomplished by separately regenerating the current $i_1$ in the circuit 4, 5 such as through the provision of a regenerating valve 6 provided with a regenerative path 7, 8 as shown and described by Fig. 1. Alternatively, the regeneration of the circuit 11, 12 may be varied, thus varying the term $$N_2 \frac{E_1 \sin \omega t}{R_1}$$

through a variation of the reacting condenser 16. In this manner; that is by adjusting the reaction condensers 8 or 16, any desired shape of the current peaks $i_2$ can be secured.

As will be obvious, any other suitable arrangement having a non-linear characteristic may be used for combining the currents in place of a push-pull system shown in Fig. 1. Thus, in the example of an inventive system according to Fig. 2, a rectifying circuit is used comprising four rectifiers of any suitable type such as contact metal rectifiers or discharge rectifiers shown schematically at 35, 36, 37, and 38 and forming the branches of a bridge circuit. The branches containing the rectifiers 36 and 38 further include a portion of a balancing resistance 39 provided with a tap point forming one terminal of one of the diagonal bridge branches, the other terminal of this diagonal branch being formed by the junction of the rectifiers 35 and 37. The other diagonal branch of the bridge is formed by the junction of the rectifiers 37 and 38 and 35 and 36, respectively. The first input circuit 4, 5 carrying one of the input currents is connected to one diagonal branch of the bridge and the other input circuit 11, 12 is connected to the other diagonal branch of the bridge, the latter also serving for connection of the output circuit interconnected between the grid and cathode of the regenerative or reaction valve 40. The anode of the latter is shown to be connected to the positive pole of a high tension source in series with a high frequency choke coil 41 and the cathode lead of this tube is shown to include a biasing resistance 42 shunted by a condenser 43. The regenerative circuit path comprising reaction condenser 16 and tickler coil 15 is connected in a manner similar as described by Fig. 1.

In the example illustrated, the voltage impulses or peak potentials supplied at the output terminals $a$ and $b$ are used for exciting a further valve 44 serving as an impulse exciter for a multiple tuned circuit comprising an inductance coil 45 and condenser 46 connected in the anode circuit of the valve 44. For the latter purpose, the valve 44 is highly negatively biased, such as by means of a biasing battery 47 connected in the cathode lead and serving for placing a relatively high positive potential on the cathode of the valve with respect to ground, resulting in a corresponding negative grid bias. The battery 47 is shown shunted by a condenser and it is understood that a self-bias arrangement may be provided in place of the battery 47 similar as shown for the preceding valve. As a result, the grid of the valve 44 is excited by impulses of very short duration following each other at regular intervals. The efficiency (oscillatory energy in the anode circuit divided by the direct current anode power) of an arrangement of this type may be as high as 98%.

The circuit 45, 46 may be tuned either to the frequency of the input current source 1 whereby the system operates in transforming the sinusoidal input current into an impulse current, or alternatively, the circuit 45 and 46 may be tuned to a multiple of the frequency of the input current supplied by the source 1. In the latter case the system constitutes an impulse or shock excitation oscillator similar to a spark transmitter known during the early period of wireless communication. The efficiency of the energy conversion in the latter case is also very high and substantially higher than in any one of the known orthodox regenerative oscillating systems in the art. If the circuit 45, 46 is tuned to a high frequency and the frequency of the input or exciting currents supplied by the source 1 chosen in such a manner that the output exciting impulses follow each other in rapid sequence; that is, e. g. once for each ten cycles of the frequency of the oscillatory circuit 45, 46 and if the damping of the circuit 45, 46 is made sufficiently low, the resultant oscillating current in the circuit 45, 46 is comprised of successive wave trains following each other rapidly in such a manner as to represent a practically undamped carrier wave.

In Fig. 4 I have shown explanatory diagrams of a shock excitation oscillator of this type wherein $e(i_2/\omega C_2)$ represents the exciting impulses supplied by the impulse exciter or driver at the terminals $a$ and $b$, and $i_a$ represents the successive free wave trains set up in the circuit 45, 46 by impulse excitation.

As follows from the above, a system especially of the type shown by Fig. 2, may be used as a frequency multiplier for transforming an input current of low frequency supplied by the source 1 into a current of a desired high frequency being a whole multiple of the frequency of the fundamental or input current. In this application the invention has many uses in practice, especially in cases where currents of substantially identical frequency are to be produced at separated locations. For this purpose it is only necessary to provide impulse excited oscillators or transmitters of the type described at these locations controlled by a common fundamental current generated at a central station and transmitted simultaneously to the separate impulse excited oscillators. In this manner it is possible to use comparatively low controlling frequencies which can be efficiently transmitted over cables or transmission lines without interference and which then serve for exciting the separate oscillators in a manner as described by the invention.

In the last described embodiment, the invention, as will be understood, has particular advantages in common wave broadcasting systems comprising a plurality of broadcast transmitters located so as to cover separate densely populated service areas and operated on a common wave length. A requisite for successful operation of such a system as is well known consists in the maintenance of substantial equal carrier frequencies for the separate transmitters to avoid mutual interference in receivers located within an area in between two stations and simultaneously receiving from more than one station.

Instead of providing a parallel or multiple tuned impulse excited circuit as shown in Fig. 2, any other well known impulse or shock excited system may be provided in connection with an exciter or driving system as described by the present invention. Thus, referring to Fig. 5, I have shown a series tuned circuit comprising an induction coil 51 and a condenser 52 connected in the anode circuit of the exciting valve 44 which is in turn controlled by an impulse exciting system of the type according to Figs. 1 and 2 and indicated schematically in the drawing by a rectangle. A further circuit comprising an induction coil 49 and a condenser 50 is coupled with the induction coil 51 and represents the utilization circuit which may be an antenna or any other high frequency consuming device, such as a high frequency furnace, electromedical apparatus, or the like. Item 54 represents a high tension battery for the valve 44, and item 55 the usual choke coil in the battery leads to prevent high frequency currents from entering the battery circuit.

Referring to Figs. 6 and 7, I have shown the invention as applied to a shock excitation system for producing ultra-short waves of extremely high frequency similar to the arrangement as described in Fig. 5. As is well known, one disadvantage in producing ultra-short waves (below 10 meters) by the orthodox method of regeneration is due to the fact that with a decrease of frequency the dimension of the circuit elements such as condensers and induction coils decrease considerably, resulting in a substantially decreased power capacity of generators of this type. By using a shock excited generator operated by a high frequency driving current supplied by the source 1 according to Figs. 1 and 2, the power capacity and efficiency can be increased considerably as compared with the orthodox type of ultra-short wave systems known in the art.

The arrangements according to Figs. 6 and 7 merely differ from the device described by Fig. 5 in that the oscillatory circuit consists of a single rod shown at 56 having inherent capacity and inductance determining the frequency of the ultra-short wave oscillations. The anode current is supplied to the exciting valve through the choke coil 55 connected to a voltage nodal point on the oscillating rod 56 in a manner well known in the art. The oscillating rod 56 may be provided with discs at both of its ends for increasing its electrical capacity. One of these discs may be formed by the anode of the valve itself, such as shown in Fig. 6, while Fig. 7 shows an oscillating rod 58 with a free end. Item 57 is a by-pass capacity connected between the high tension supply point on the oscillator and ground.

It will be understood that any other type of shock excited system may be provided wherein the exciting valve 44 takes the place of the hitherto known devices generating the exciting impulses, such as spark gap or the like.

Referring to Figs. 8 and 9, I have shown a further embodiment of the invention relating to a super-regenerative receiving system. Item 60 represents a receiving antenna coupled with a receiving circuit comprising an induction coil 61 and a condenser 62 connected in parallel in a usual manner. The receiving circuit is shown to control an amplifying valve 63 through a grid coupling condenser 63' and grid leak 68 as known in the art. Item 64 represents a high tension battery for supplying the anode current for the valve 63 shunted by a capacity 69. 65 is a high frequency choke coil connected in the anode current supply lead in a known manner, and items 66 and 67 represent a reaction condenser and tickler coil, respectively, the latter being in inductive connection with the input inductance 61 and forming a feedback circuit for regenerating the input oscillations set up in the circuit 61, 62. The impulse generator which may be of the type described by Figs. 1 and 2 with output terminals $a$ and $b$ is shown connected in series with the anode voltage source 64 in an opposite sense to the anode potential in such a manner that the anode potential $e_a$ will be positive during prolonged periods but will drop to zero or even become negative at regular intervals as seen more clearly from the diagram shown by Fig. 9.

As is well known, the function of a super-regenerative circuit resides in the adjustment of the feedback or regeneration from the output circuit to the input circuit of the valve in such a manner that under normal conditions the impedance of the input circuit would be "negative" so as to result in the production of self-excited oscillations. The latter, however, is prevented due to the periodic quenching of the circuit caused in the present example by the function of the impulse voltage applied to the anode of the valve. In this manner the impedance of the circuit builds up periodically to extremely high values, resulting in a considerable amplification of the input signals while the production of sustained oscillations in the circuit is prevented by the periodic quenching action, as is understood. Due to the sharpness and regularity of the voltage peaks supplied by a system as described, the operation of the super-regenerative receiver is rendered extremely uniform and stable as compared to similar systems hitherto known in the art.

If it is desired to modulate the peak voltage oscillations supplied such as described in Figs. 1 and 2, it is only necessary according to a further feature of this invention to modulate one of the input current components; that is, the currents in either the circuit 4, 5 or 11, 12, respectively. Referring to Fig. 2, I have shown such a modulating arrangement comprising a microphone or other modulating device shown at 31 arranged in an intermediate circuit comprising inductance coils 29 and 30 coupled with the inductance 3 of the input circuit on the one hand, and the inductance 11 of the input oscillatory circuit for the reaction valve 40. The degree of modulation of the input currents should preferably be of very low order to secure a substantially 100% modulation of the antenna or output current supplied in the shock excited circuit 45, 46 or an antenna circuit operatively associated with the latter. This becomes obvious from Fig. 10 where $I_a$ represents a characteristic curve (anode current as a function of grid potential) of the output valve, such as the valve 44 according to Fig. 2. The grid of this valve receives the modulated impulses of very short duration and determined by $i_a/\omega C_2$. From Fig. 10 it is clear that while the input current is low modulated, the output current shall be fully modulated at the highest efficiency due to the high negative grid bias $E_g$ applied to the output valve 44. As will be understood, in order to secure linear modulation in the output circuit, the grid swings of the peak volage should remain within the straight line portion of the valve characteristic.

It will furthermore be evident that any suitable type of electron discharge valve, such as gaseous discharge valves, may be used in place of the high vacuum valves as illustrated in the drawing.

As above pointed out, the efficiency of the transfer of direct current energy into periodic impulses does not take into account the loss of the cathode heating energy and the energy required for exciting the impulse generating or driver system including the separate valves and losses in the associated devices. The cathode heat energy, however, can be kept relatively low by using higher potentials on the anodes and by using valves with very high emission such as valves containing a suitable gas. The ratio of the output power to the driving power can also be kept high by proper design of the circuits and selection of valves of suitable operating characteristics. In this manner it is possible to secure an all-over efficiency of a considerable higher value than has been possible hitherto in the orthodox oscillating arrangements known in the art. This efficiency may reach values as high as 92 to 95% which is of great importance both in the radio and allied electrical arts as will be later appreciated.

As will be understood, the novel effect according to the invention may be secured in various different ways and combinations all having in common the deriving of at least two components of an input current, the combining of the same so as to obtain a resultant product function and the reacting or regeneration of the resultant current upon one of the original components. The inventive method and system is therefore essentially independent of the types and methods of mixing and regeneration used and it will be understood that any suitable means known in the art may be employed for practicing the invention.

As will be evident from the above description, the invention is not limited to the specific embodiments presented herein for illustration, and the underlying principle and inventive concept is susceptible of numerous modifications differing from the specific disclosure herein presented and coming within the broad scope and spirit of the invention as defined in the appended claims.

I claim:

1. An electrical system comprising means for producing separate alternating currents of equal frequency; a device having non-linear input-output characteristics; means for applying said currents to said device to produce a combined resultant current; means for amplifying said resultant current; and means for reacting upon one of said current components with a current derived from the amplified current.

2. An electrical system comprising a source of substantially sinusoidal alternating current of predetermined frequency; means for deriving separate current components of substantially equal frequency from said source; a modulating device; means for applying said current components to said device to produce a combined distorted resultant current by mutual modulation of said components; a space discharge amplifier having an input and an output circuit; means for controlling said space discharge device by said resultant current; and means for deriving amplified feedback energy from said output circuit to react upon one of said current components, and a utilization circuit operatively connected with said input circuit.

3. An electrical system comprising a pair of circuits; means for setting up alternating currents in said circuits of substantially the same frequency; a mixing device connected with said circuits to produce a combined resultant current whose instantaneous values are a product function of the instantaneous values of the currents in said circuits; an amplifier having an input circuit energized by the output of said mixing device; and a regenerative circuit connecting the output of said amplifier and one of said circuits.

4. An electrical system as claimed in claim 3 comprising means for adjusting the degree of regeneration of said amplifier.

5. An electrical system as claimed in claim 3 in which said mixing device comprises a pair of electron valves connected in push-pull and means whereby the grid electrodes of said valves are controlled by said first circuit at opposite phase relation and whereby said grids are controlled by the currents of said second circuit at equal phase relation.

6. An electrical system as claimed in claim 3 in which said mixing device is comprised of four rectifying devices forming a bridge system and wherein said first circuit is inserted in one of the diagonal bridge circuits and said second circuit is inserted in the remaining diagonal bridge circuit.

7. An electrical system as claimed in claim 3 including an electron valve having input and output circuits, the last mentioned input circuit being energized from the output circuit of said mixing device; means for applying a high negative bias to the grid of said last mentioned valve to secure highly peaked regular current impulses in the output circuit of said last mentioned valve.

8. An electrical system as claimed in claim 3 including an electron valve having input and output circuits, the last mentioned input circuit being energized from the input circuit of said mixing device; means for applying a high negative bias to the grid of said last mentioned valve and an oscillatory circuit connected in the output circuit of said last mentioned valve.

9. An electrical system as claimed in claim 3 including an electron valve having input and output circuits, the last mentioned input circuit being energized from the input circuit of said mixing device; means for applying a high negative bias to the grid of said last mentioned valve to secure highly peaked regular current impulses in the output circuit of said last mentioned valve, and means for modulating the current components in one of said first mentioned circuits.

10. The method of producing periodic peak voltages consisting in combining a pair of sinusoidal currents of substantially the same frequency and deriving therefrom a resultant current whose instantaneous values are a product function of the instantaneous values of said first mentioned currents; and regeneratively reacting upon one of said first mentioned currents with a current derived from said resultant current.

11. The method of producing periodic peak voltages consisting in generating a pair of substantially sinusoidal currents of substantially the same frequency; mutually modulating said currents to derive therefrom a resultant current whose instantaneous values are a product function of the instantaneous values of said first current; amplifying said resultant current, and regeneratively reacting with the amplified currents upon one of said input currents.

12. A method of producing periodic peak voltages comprising the steps of generating a pair of substantially sinusoidal currents of like frequency, mutually modulating said currents to derive therefrom a resultant current of distorted wave shape, amplifying the resultant current and regeneratively reacting upon one of said first currents with amplified energy derived from said resultant current.

JOZEF PLEBANSKI.